No. 730,600. Patented June 9, 1903.

UNITED STATES PATENT OFFICE.

LÉONCE BEAUMEL, OF TOULOUSE, FRANCE.

MANUFACTURE OF COMPOSITIONS FORMING IMITATIONS OF STATUARY-MARBLE.

SPECIFICATION forming part of Letters Patent No. 730,600, dated June 9, 1903.

Application filed September 19, 1902. Serial No. 124,087. (No specimens.)

*To all whom it may concern:*

Be it known that I, LÉONCE BEAUMEL, chemist, a citizen of the Republic of France, and a resident of Toulouse, in the Republic of France, have invented a new and useful manufacture of an Improved Composition Forming an Imitation of Statuary-Marble, which manufacture is fully set forth in the following specification.

This invention relates to the manufacture of an improved composition for imitating in a perfect manner statuary-marble, onyx, polychromatic materials, and the like.

My improved composition is formed by mixing together alum, sulfate of baryta, and water. The proportions, by weight, which appear to be most suitable are as follows: alum, one thousand parts; sulfate of baryta, ten to one hundred parts; water, one hundred parts. The proportion of sulfate of baryta employed depends upon the degree of transparency which it is desired to give to the product.

It is to be understood that the mixture, according to the nature of the marble to be imitated, can be colored by using a suitable coloring substance.

In carrying my said invention into practice I preferably proceed as follows: I dissolve the alum in the required quantity of warm water, which is heated to the boiling-point, and when boiling takes place I add thereto the required quantity of sulfate of baryta, which has been previously mixed with a suitable quantity of water and the coloring matter, if this is desired. This mixture is then subjected to evaporation until it has lost about three per cent. of its original weight. The density of the mixture at a temperature 100° centigrade is then about 34° Baumé. The mixture is then allowed to cool while being kept constantly agitated or stirred until it has the consistency of a slightly-liquid paste. If it is required to imitate a veined or streaky marble, there are then added to this paste pasty coloring substances, which are insoluble in the mixture, and the added fragments of which have the requisite shape to imitate the veins or like marks to be produced.

In some instances a sectional mold is prepared the internal wall of which is coated with several layers of collodion and the pasty mixture is poured therein. When the mixture is sufficiently cooled and set, the mold is taken to pieces and the statue or other object formed therein is removed and placed in a dry and airy situation, where the drying process is completed. The statue or other object can then be submitted to the process of polishing or finished in any other suitable manner, as desired.

If it is required to produce imitation onyx or to make imitations of polychromatic objects, the alum is poured directly into a mold while still very liquid and without the addition of sulfate of baryta. To the liquid alum in the mold are then added fragments of alum of different sizes which have been previously tinted or colored in any suitable manner. After cooling and setting the composite material is removed from the mold, as in the preceding case.

Having now particularly described and ascertained the nature of my said invention and in what manner the same is to be performed, I declare that what I claim is—

1. The herein-described process of forming artificial stone or marble, consisting in first dissolving alum in water and heating the same to boiling-point, then adding a solution of sulfate of baryta, then subjecting the whole to evaporation to increase its density, then cooling the same under constant agitation, until it assumes a pasty consistency and finally allowing the mass to harden.

2. The herein-described process of forming artificial stone or marble, consisting in first dissolving alum in water and heating it to the boiling-point, then adding a solution of sulfate of baryta, then subjecting the whole to evaporation to increase its density, then cooling the mixture under constant agitation, until it assumes a pasty consistency, then adding fragments of coloring substances to impart veins or the like in the mass.

In testimony whereof I have signed this specification in the presence of two subscribing witnesses.

LÉONCE BEAUMEL.

Witnesses:
 WALFITT LUNBERG,
 L. ALIX.